(12) United States Patent
Thiyagarajan et al.

(10) Patent No.: US 8,225,212 B2
(45) Date of Patent: Jul. 17, 2012

(54) METHOD FOR PROVIDING REMOTE CONTROL DEVICE DESCRIPTIONS FROM A COMMUNICATION NODE

(75) Inventors: Venkatesan Thiyagarajan, Bangalore (IN); Arun L. Gangotri, Bangalore (IN); Sachin D. Mule, Bangalore (IN); Madan Mohan Nayak, Keonjhar (IN)

(73) Assignee: Sling Media Pvt. Ltd., Bangalore (IN)

( * ) Notice: Subject to any disclaimer, the term of this patent is extended or adjusted under 35 U.S.C. 154(b) by 518 days.

(21) Appl. No.: 12/544,680

(22) Filed: Aug. 20, 2009

(65) Prior Publication Data

US 2011/0047465 A1 Feb. 24, 2011

(51) Int. Cl.
*G06F 3/048* (2006.01)
*G06F 15/16* (2006.01)

(52) U.S. Cl. ........ 715/734; 715/765; 715/810; 725/110; 709/203; 709/204

(58) Field of Classification Search .................. 715/716, 715/719, 733, 734, 739, 764, 765, 810, 835; 725/25, 37, 110; 709/201, 203, 204, 208, 709/213
See application file for complete search history.

(56) References Cited

U.S. PATENT DOCUMENTS

| 8,055,688 | B2 * | 11/2011 | Giblin ........................... 707/804 |
| 2005/0076127 | A1 * | 4/2005 | Wilson et al. .................. 709/227 |
| 2008/0022298 | A1 * | 1/2008 | Cavicchia ....................... 725/25 |
| 2010/0169945 | A1 * | 7/2010 | Kennedy et al. ............... 725/110 |

* cited by examiner

*Primary Examiner* — Xiomar L Bautista
(74) *Attorney, Agent, or Firm* — Ingrassia Fisher & Lorenz, P.C.

(57) ABSTRACT

A method of providing a description of a remote control device to a communication device configured to interact with an electronic device over a communication network as a remote control device is presented. In the method, the communication device transfers an indication of the electronic device over the network to a communication node. Afterward, the communication device receives the description of the remote control device associated with the electronic device from the node over the network. The communication device transfers a command associated with the remote control device over the network to the electronic device, wherein the command is generated using the description of the remote control device.

16 Claims, 8 Drawing Sheets

METHOD FOR PROVIDING REMOTE CONTROL DEVICE DESCRIPTIONS FROM A COMMUNICATION NODE

BACKGROUND

Video place-shifting devices, including the Slingbox® by Sling Media Inc., allow users to access a video content source, such as a satellite or cable television set-top box, standalone digital video recorder (DVR), or digital video disc (DVD) player, from a remote location. For example, a user on a business trip far from home may use a desktop or laptop computer, cellular phone, personal digital assistant (PDA) or other communication device to communicate with a place-shifting device attached to a television set-top box located in the user's home by way of the Internet, cellular network, or other communication network. Through this communication, the user may control the set-top box to perform a variety of functions, including setting recording timers for an internal DVR, viewing audio/video programming being received live at the set-top box, and viewing programs previously recorded on the set-top box DVR. To view this programming, the set-top box transfers the data over the same communication network to the communication device, which presents the programming to the user by way of an output display, such as a computer screen.

To allow the user to control the set-top box, the place-shifting device typically communicates with the set-top box by way of the infrared remote control interface of the set-top box. Thus, the place-shifting device is designed to receive commands representing remote control device commands from the user by way of the communication network, and to transmit those commands by way of infrared signals to the set-top box. Thus, the user is employing the communication device as a sort of remote control emulation device to control the set-top box remotely without being in the same room as the set-top box.

To facilitate this emulation, the communication device may execute software that essentially mimics a remote control device of the set-top box from the user's perspective. For example, the video display of the communication device may present a graphical representation of a remote control designed to control the set-top box, upon which the user may employ a mouse or other user interface mechanism to "press" one or more "buttons" of the displayed remote control device to issue commands by way of the place-shifting device to the set-top box. Other mechanisms by which the user may input remote control commands to the communication device may also be utilized.

In addition to multiple types of video source devices, such as set-top boxes, DVRs, and DVD players, place-shifting devices are often configured to communicate with multiple brands and models of each video source device type. Further, each model is often provided with a specific remote control device that allows the user to access every function provided by that particular source device. Thus, the communication device should generally be capable of providing that same remote control device functionality for each video source device that is compatible with the place-shifting device.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
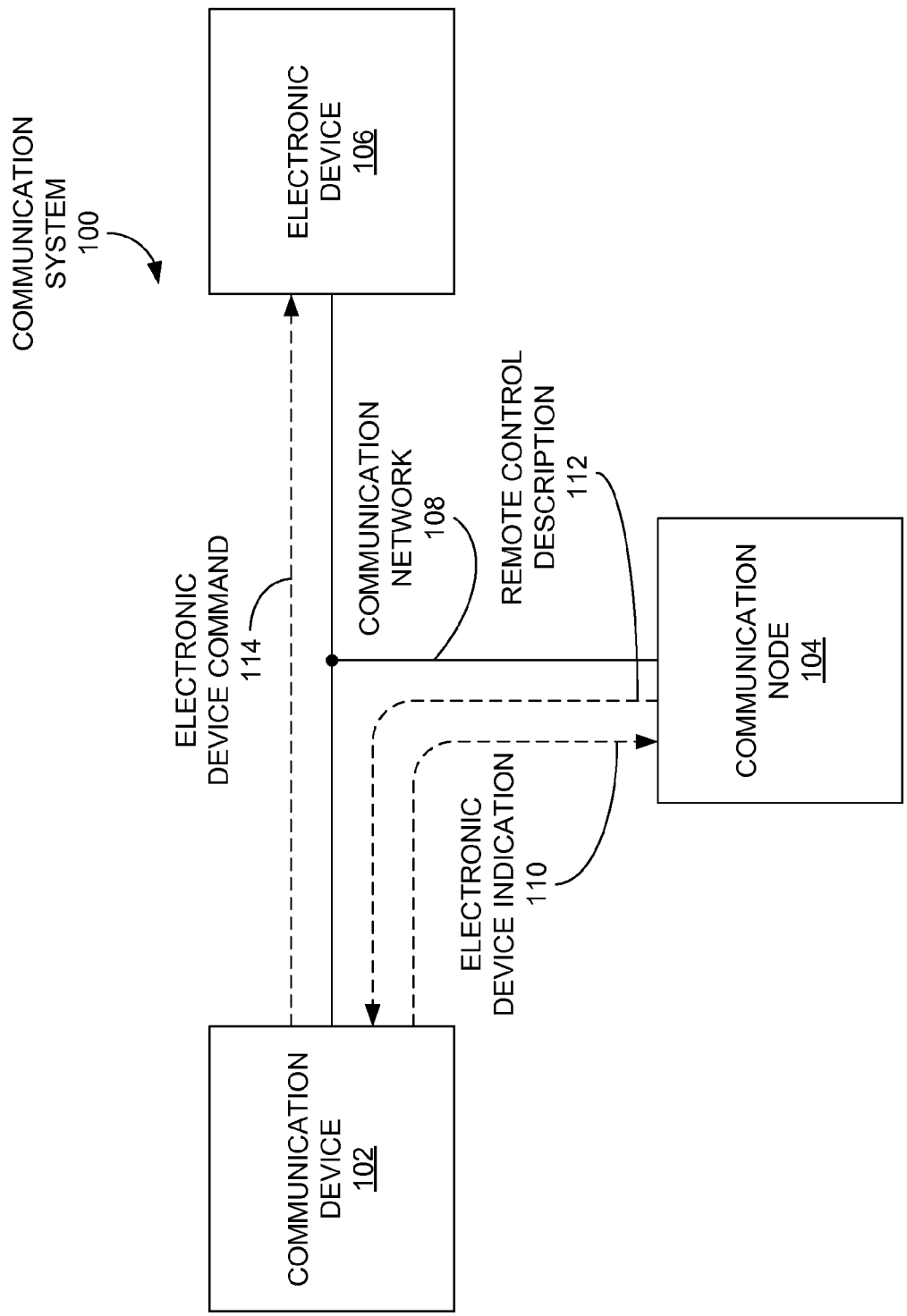
FIG. 1 is a block diagram of a communication system according to an embodiment of the invention.

FIG. 1 provides a block diagram of a communication system 100 according to an embodiment of the invention. The system 100 includes a communication device 102, a communication node 104, and an electronic device 106, each of which is coupled with a communication network 108. In one implementation, the communication network 108 is a wide-area network (WAN), such as the Internet, thus allowing these devices 102, 104, 106 to be spaced apart by significant geographical distances.

Generally, the communication system 100 allows an electronic device 106 to be controlled by a communication device 102 emulating or mimicking a remote control device for the electronic device 106 by way of the communication network 108. Examples of the electronic device 106 include, but are not limited to, a satellite, cable, or terrestrial ("over-the-air") receiver or set-top box, a standalone DVR, a DVD player, and any other device capable of presenting media content, such as audio/video content, over the communication network 108. Moreover, the electronic device 106 may be any device designed to be controlled by way of a remote control device, such as an infrared (IR) or radio-frequency (RF) remote.

Similarly, the communication device 102 may be any device capable of controlling the electronic device 106 and receiving media content from the electronic device 106. Such communication devices 102 may include, but are not limited to, a personal or laptop computer, a cellular phone, and a PDA.

Figure 2:
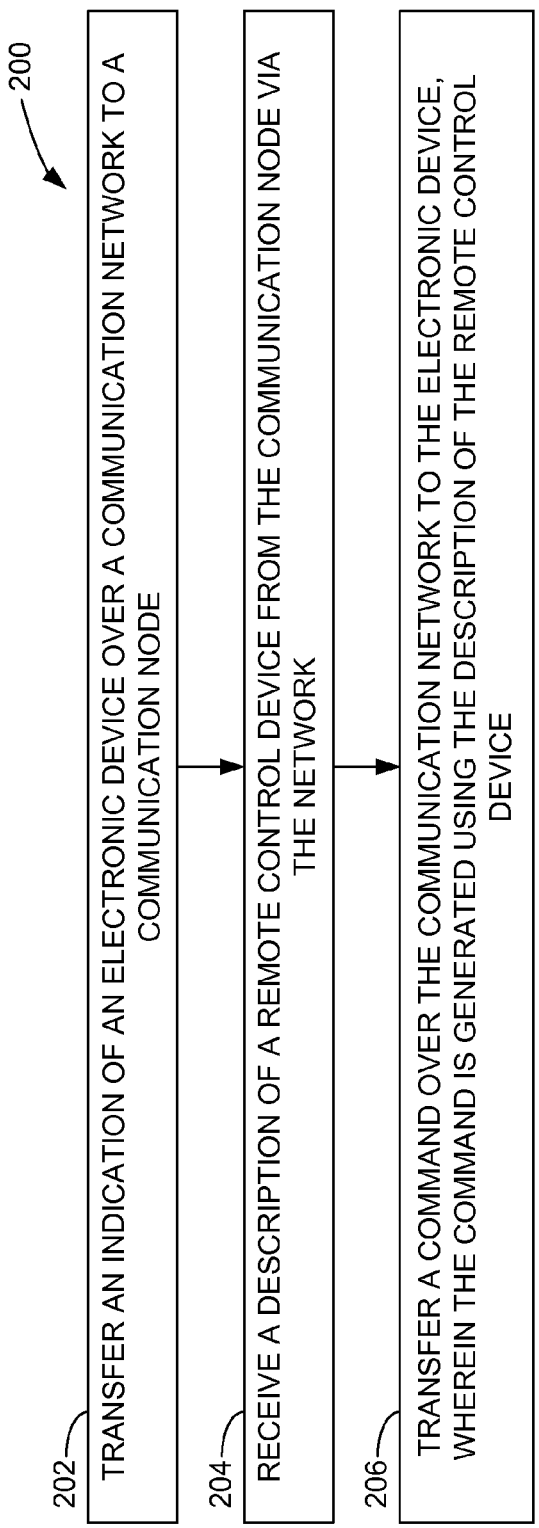
FIG. 2 is a flow diagram of a method according to an embodiment of the invention for providing a description of a remote control device to a communication device configured to interact with an electronic device as a remote control device.

FIG. 2 is a flow diagram of a method for providing a description of the remote control device to be emulated to the communication device 102 in the system 100. In the method 200, the communication device 102 transfers an indication 110 of the electronic device 106 over the communication network 108 to the communication node 104 (operation 202). The communication node 104 then transmits a description 112 of a remote control device to the communication device 102 (operation 204). The communication device 102 then transfers a command 114 over the communication network 108 to the electronic device 106, wherein the command is generated using the description 112 of the remote control device (operation 206). In some implementations, the command 114 is transferred over the communication network 108 to a place-shifting device (not shown in FIG. 2), which then forwards the command 114 to the electronic device 106. In another embodiment, a computer-readable storage medium may have encoded thereon instructions for at least one processor or other control circuitry of the communication device 102 of FIG. 1 to implement the method 200.

As a result of at least some embodiments of the method 200, the communication node 104 may serve as a central repository for descriptions for many different types of remote control devices available, including both remote control devices specifically provided with electronic devices 106 to be controlled, as well as more generic or "universal" remote control devices. Any communication device 102 may then indicate to the node 104 the particular electronic device 106 to be controlled, resulting in the node 104 transmitting the description 112 of a suitable remote control device associated with the electronic device 106 to the communication device 102, which may then utilize that description 112 to control the electronic device 106. Such an arrangement would negate the need for each communication device 102 to store all possible remote control device descriptions for all electronic devices 106 that may be controlled over the network 108. Other advantages may be recognized from the various implementations of the invention discussed in greater detail below.

Figure 3:
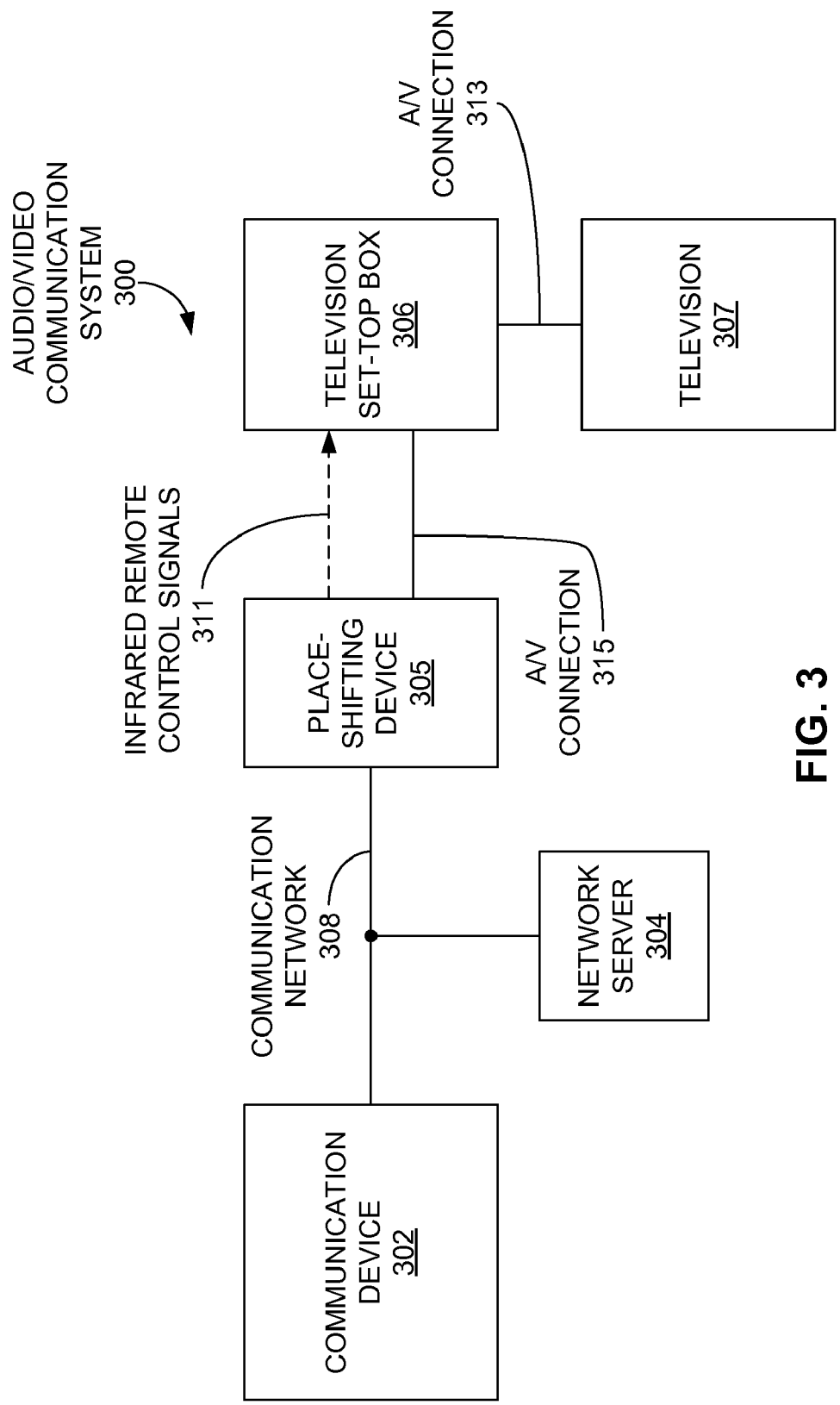
FIG. 3 is a block diagram of an audio/video communication system according to an embodiment of the invention.

FIG. 3 is a block diagram of an audio/video communication system 300, which represents a more detailed example of the communication system 100. The audio/video communication system 300 includes a communication device 302, a network server 304 (serving as an example of the communication node 104 of FIG. 1), a place-shifting device 305, a television set-top box 306 (representing an example of the electronic device 106 of FIG. 1), and a television 307. As typically seen, the television set-top box 306 is coupled with the television 307 by way of an audio/video connection 313 to display or present to a user selected audio/video programming from an audio/video source, such as a satellite in geosynchronous orbit, a coaxial cable head-end, or a terrestrial antenna.

The place-shifting device 305 may also be coupled with the set-top box 306 by way of another audio/video connection 315 so that programming received by way of the set-top box 306 may be forwarded to the communication device 302 over a communication network 308. In another example, the place-shifting device 305 may provide an audio/video output (not shown in FIG. 3) to pass audio/video programming received from the set-top box 306 to the television 307. Such an arrangement may be advantageous if the set-top box 306 only provides a single audio/video output connection.

The place-shifting device 305, such as one of several models of Slingbox® provided by Sling Media Inc., may also produce infrared remote control signals 311 so that the place-shifting device 305 may transmit commands to the set-top box 306 by way of an infrared remote control device input of the set-top box 306. Generally, these commands are the same as those transmitted by a remote control device that is normally supplied to the user with the set-top box 306. In other examples, other forms of remote control signals, such as radio frequency (RF) signals or acoustic signals, may be employed in other implementations.

In FIG. 3, the communication device 302 may be any device capable of communicating with the place-shifting device 305 and the network server 304 over the communication interface 308, including, but not limited to, desktop or laptop computers, cellular phones, and PDAs. The communication device 302 originates the commands intended for the set-top box 306 by transmitting such commands over a communication network 308 to the place-shifting device 305, which may then transform the commands from a format compatible with the network 308 into the infrared remote control signals 311. In one example, the communication network 308 may be a wide-area network (WAN), such as the Internet. In that case, the commands transmitted by the communication device 302 to the place-shifting device 305 may be formatted as digital data in one or more data packets conforming to Transmission Control Protocol/Internet Protocol (TCP/IP), although other communication protocols may be employed to similar end in other embodiments. The place-shifting device 305 then converts that data into a form acceptable to the set-top box 306 as infrared remote control signals 311.

To determine the data needed to generate the commands intended for the set-top box 306, the communication device 302 provides an indication as to the nature or identity of the set-top box 306 expected to receive the commands. In response, the network server 304 provides information describing one or more remote control devices capable of transmitting commands via infrared signals 311 to the set-top box 306. The communication device 302 then utilizes this information to generate the commands that are transmitted as data packets over the communication network 308.

Figure 4:
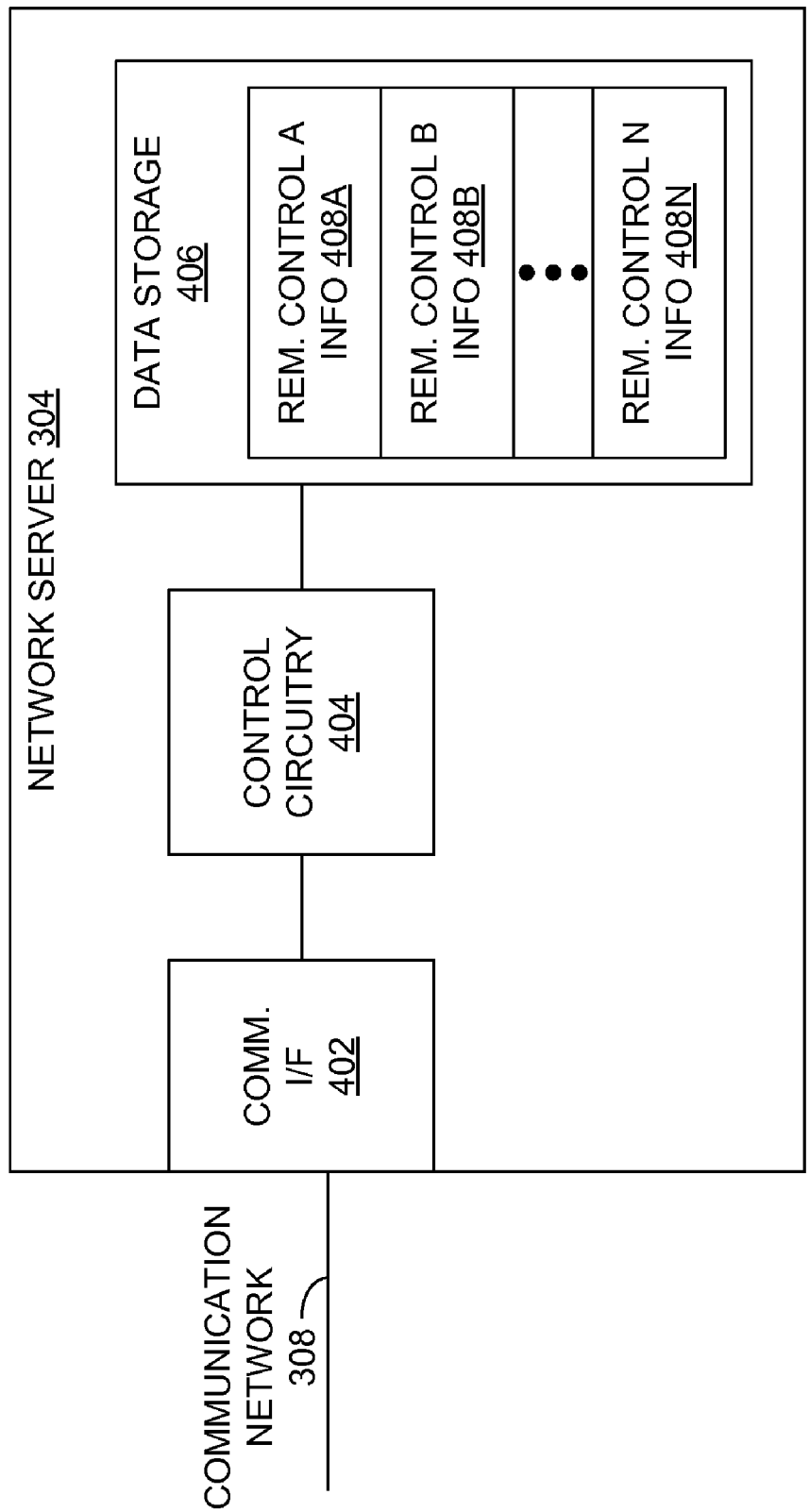
FIG. 4 is a block diagram of a network server of the communication system of FIG. 3 according to an embodiment of the invention.

FIG. 4 is a block diagram of the network server 304 of FIG. 3 according to one implementation. In this particular example, the server 304 includes a communication interface 402, control circuitry 404, and data storage 406. Other components, including, but not limited to, a user interface and a power supply, may also be included in the network server 304, but such components are not explicitly shown in FIG. 4 nor discussed below to simplify the following discussion.

The communication interface 402 is a wired or wireless interface configured to communicate with the communication device 302 over the communication network 308, such as the Internet, as described above. Other communication interfaces, such as a local-area network (LAN) interface or a wireless network adapter, may be utilized in other versions of the network server 304

The data storage 406 is configured to store information 408 describing each of a plurality of remote control devices A, B, . . . , N. The nature of the remote control descriptions 408 is discussed more fully below. The data storage 406 may be any data storage capable of storing digital data, including volatile data storage, such as dynamic random-access memory (DRAM) or static random-access memory (SRAM), nonvolatile data storage, such as flash memory, magnetic disk drives, and optical disk drives, or combinations thereof.

The control circuitry 404 is communicatively coupled with both the communication interface 402 and the data storage 406 to perform the functions more particularly described hereinafter. In one example, the control circuitry 404 may include one or more processors, such as microprocessors, microcontrollers, or digital signal processors (DSPs), configured to execute instructions designed to control the communication interface 402 and the data storage 406 as discussed below. These instructions may be stored in the data storage 406 or another data storage or memory unit not specifically illustrated in FIG. 4. In another implementation, the control circuitry 404 may be composed of hardware circuitry not requiring software instructions, or of some combination of hardware and software elements.

Figure 5:
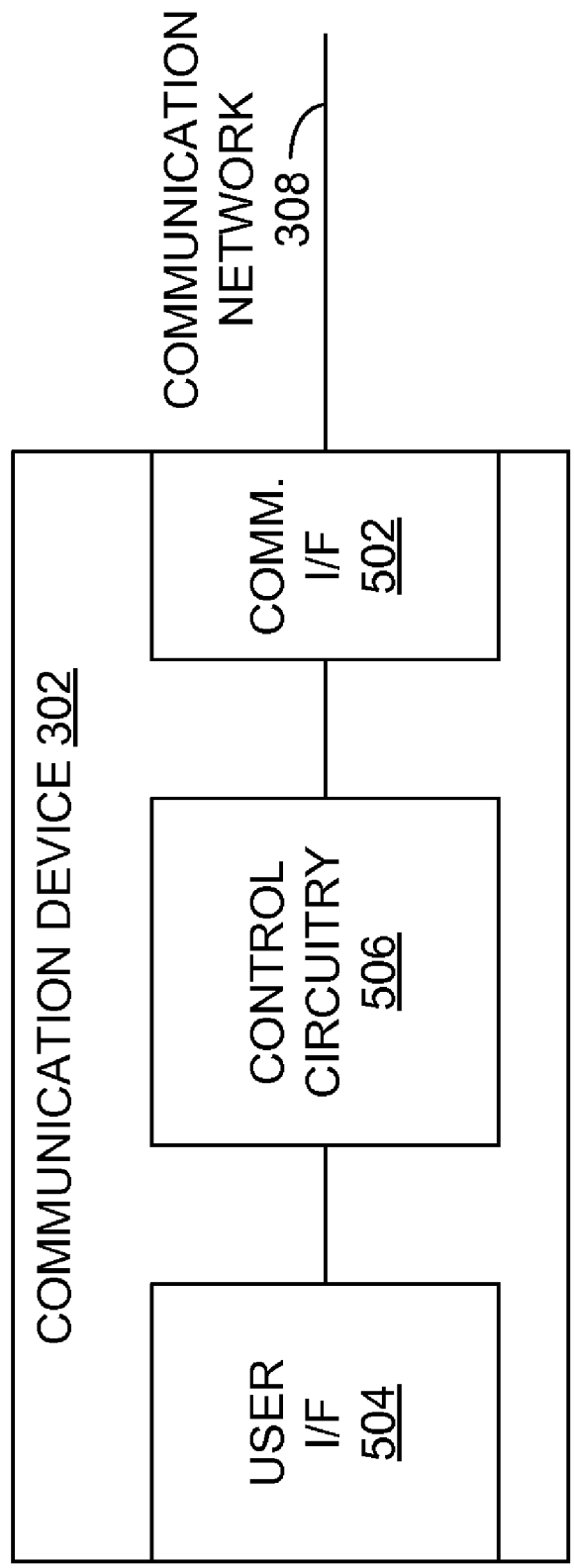
FIG. 5 is a block diagram of a communication device of the communication system of FIG. 3 according to an embodiment of the invention.

FIG. 5 is a block diagram of the communication device 302 of FIG. 3 according to another embodiment of the invention. The device 302 includes a communication interface 502, a user interface 504, and control circuitry 506. Other components, such as a power supply and data storage, may also be included in the communication device 302, but such components are not explicitly shown in FIG. 5 nor discussed below to simplify the following discussion.

The communication interface 502 of the communication device 302 is configured to communicate with the network server 304 and the place-shifting device 305 of FIG. 3. As with the communication interface 402 of the server 304, the communication interface 502 of the communication device 302 may be a WAN interface, such as an interface to communicate via the Internet, although other interfaces, such as a LAN interface or a wireless network adapter, may be employed in other arrangements.

The user interface 504 is configured to receive commands from a user of the communication device 302 for controlling the set-top box 306 of FIG. 3. The user interface 504 may include any number of input and/or output components to allow the user to interact with the communication device 302, such as a keyboard, keypad, mouse, joystick, touchpad, visual monitor, and/or video display. In some cases, the user interface 504 may incorporate its own remote control interface so that the user need not be positioned within reach of the communication device 302 to provide input thereto.

The control circuitry 506 is configured to control and interact with the user interface 504 and the communication interface 502 as described more fully below. As with the control circuitry 404 of the server 304, the control circuitry 506 of the communication device 302 may include one or more processors, such as microprocessors, microcontrollers, or DSPs, configured to execute instructions to operate the communication device 302. In other embodiments, the control circuitry 506 may include strictly hardware components, or include a combination of hardware and software elements.

Figure 6:
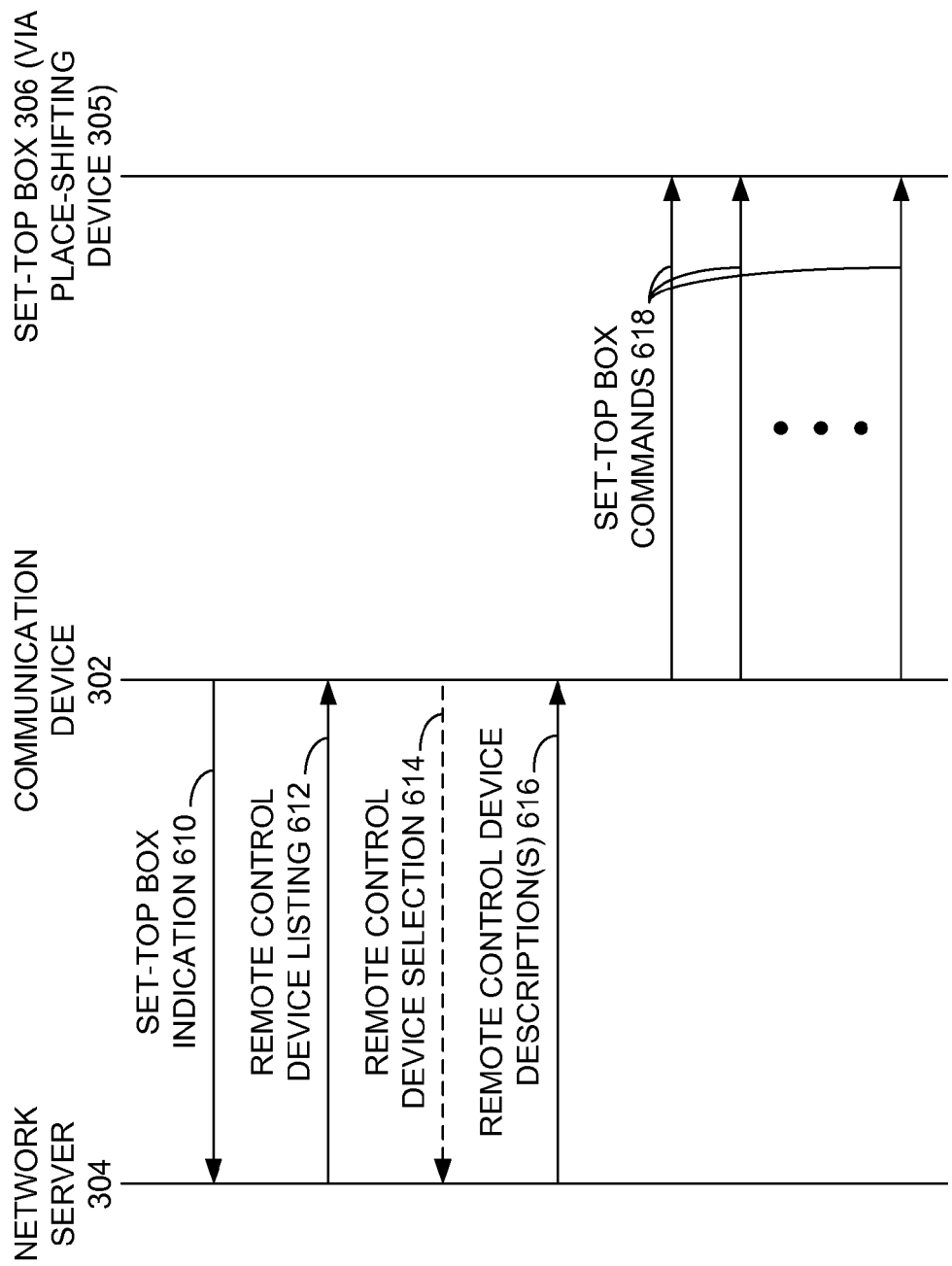
FIG. 6 is a graphical illustration of communications within the audio/video communication system of FIG. 3 according to an embodiment of the invention.

FIG. 6 is a graphical representation of communications occurring between the communication device 302, the network server 304, and the set-top box 306 (via the place-shifting device 305) in one implementation. Initially, the communication device 302 transmits an indication 610 or identity of the set-top box 306 to be controlled from the device 302. In one example, the communication device 302 may identify the set-top box 306 by way of one or more of a device type, a manufacturer or brand, and a model number. In the specific example, the device type for the set-top box 306 may be "television receiver/set-top box", "satellite television receiver/set-top box", "cable receiver/set-top box", or "terrestrial receiver/set-top box". For other types of electronic devices to be controlled, other kinds of device types may be indicated, such as "PVR" for a personal video recorder or DVR, "VCR" for a video cassette recorder, "DVD" for a DVD player, and so forth.

Similarly, a manufacturer or brand name associated with the set-top box 306, such as DISH Network, EchoStar, Motorola, or the like, may also be specified. Further, a model number further distinguishing the set-top box 306 from other set-top boxes available in the market may also be provided. By providing all of this information, the communication device 302 may identify a specific set-top box 302, the indication 610 of which is transmitted to the network server 304. In other implementations, other or less specific information, such as only the device type or only the manufacturer, may be available for identifying the set-top box 306. In that scenario, the indication 610 of the set-top box 306 may be applicable to a number of different set-top boxes, including the set-top box 306 of the system 300 of FIG. 3.

To generate the information that constitutes the indication 610, a user of the communication device 302 may directly enter one or more of the device type, brand, and model by way of the user interface 504. Further, the control circuitry 506 may provide a list of options for the device type via the user interface 504, from which the user selects a particular device type. In response, the control circuitry 506 may provide a list of brands and models reflected by the selected device type. The user may then select the particular brand and model of the set-top box 306. Such information may be gathered during an initial set-up or configuration phase of the communication device 302 or the place-shifting device 305. As a result, this indication 610 information may then be stored in either the communication device 302 or the place-shifting device 305. In the latter case, the place-shifting device 305 may transmit the indication 610 to the communication device 302 in response to the communication device 302 establishing a connection over the communication network 308 with the place-shifting device 305.

In the event the particular model of set-top box 306 is specified, the communication device 302 or the place-shifting device 305 may also generate the device (or "set-up") IR code for the model specified for the set-top box 306. If the device IR code is generated in the place-shifting device 305, the place-shifting device 305 may transfer the device IR code along with other identifying information for the set-top box 306 to the communication device 302 in response to the communication device 302 establishing a connection over the network 308 with the place-shifting device 305.

The communication device 302 then transmits the indication 610, which may include any of the device type, brand, model, and device IR code for the set-top box 306, to the communication device 302, as depicted in FIG. 6. In one example, the indication 610 is formatted as a uniform resource locator (URL) directed to the network server 304. In essence, the URL represents a request for information concerning compatible remotes for the particular set-top box 306 being used, such as server.domain.com/remotes/deviceType/SATELLITE/manufacturer/DISH/irSetu pCode/S0123. In this case, the indication 610 includes the device type, manufacturer (or brand), and device IR code, as such information may be sufficient without a model number to specifically identify the set-top box 306 of FIG. 3.

Figure 7:
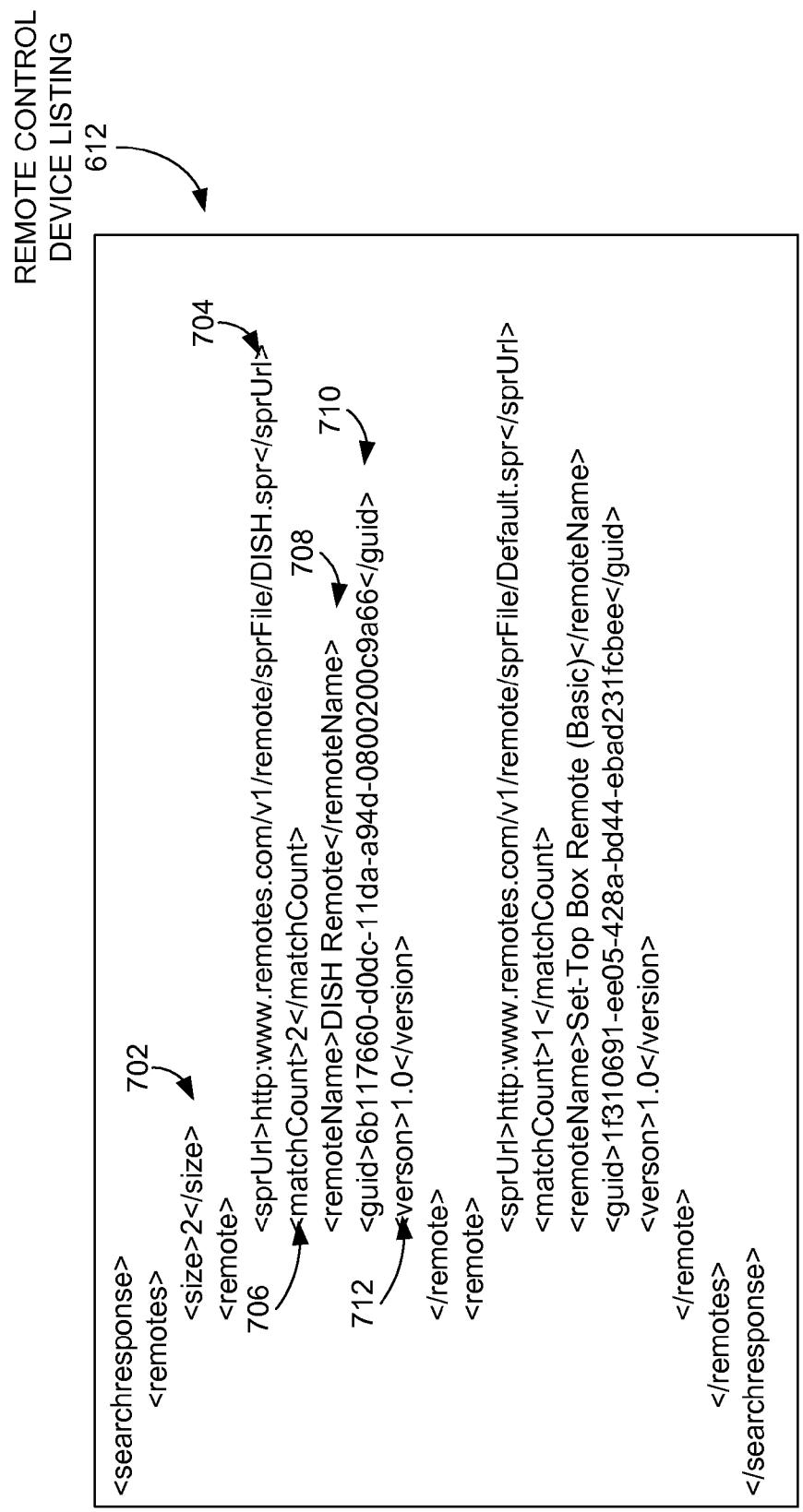
FIG. 7 is a textual representation of a listing of remote control devices provided by the network server of the audio/video communication system of FIG. 3 according to an embodiment of the invention.

In response to receiving the indication 610, the network server 304 may then transmit a listing 612 over the communication network 308 of one or more remote control devices capable of communicating with the set-top box 306. FIG. 7 provides an example of the listing 612 formatted as Extensible Markup Language (XML) code that specifies information regarding each remote control device of the listing 612. In this case, two remote control devices are listed: a remote control device associated with the manufacturer, and a generic remote control device capable of working with all video content devices. However, in other implementations, more than two remote control devices may be indicated in the listing 612. For example, a basic remote control device intended to operate primarily with set-top boxes may also be included in the listing 612. For each remote control device listed, this information includes a URL 704 of a file holding a description of the remote control device, a match count 706 associated with the remote control device, a name 708 of the remote control device, a unique identifier 710 for the remote control device, and a version number 712 associated with the remote control device or the information file associated therewith. In addition, the listing 612 may indicate the number 702 of remote control devices (in this case, two) represented in the listing 612, other than a default remote control device.

As shown in FIG. 7, the URL 704 provides a path by which the communication device 302 may retrieve information 408 describing the associated remote control device. Examples of this information are described in greater detail hereinafter.

The match count 706 for a remote control device in the listing 612 provides a quantitative indication of how closely the remote control device matches or is associated with the set-top box 306. For instance, presuming that the device type, brand, and device IR code are provided in the indication 610 from the communication device 302, the match count 706 may provide some indication as to how many of the data match the associated remote control. For example, a match count 706 of four may indicate that each of the device type, brand, and device IR code of the associated remote control device match the indication 610 received at the network server 304. If, instead, only the device type and the brand name match, a match count 706 of three may be warranted. Further, if only the device type and the device IR code match, a match count 706 of two may result. Finally, a match count 706 of 1 occurs if only the device type matches. As shown in FIG. 7, the first remote control device (the "DISH Remote"), of the listing 612 is a DISH Network remote control device whose device type (SATELLITE) and brand (DISH) match, resulting in a match count 706 of two. The second remote control device (the "Set-Top Box Remote (Basic)"), which is also defined as a "default" remote control device, only matches the device type, therefore exhibiting a match count 706 of one.

The name 708 for each of the remote control devices mentioned in the listing 612 may be any string of text characters that may identify the associated remote control in some fashion. In some implementations, the name 708 may be presented to the user by way of the user interface 504 of the communication device 302 so that the user may readily identify the associated remote control device.

To further identify a remote control device of the listing 612, the unique identifier 710, shown as a globally-unique identifier (GUID) in FIG. 7, provides an exceptionally unique value with which to identify the associated remote control device, thus possibly providing identification that is more unique than the name 708 shown in the listing 612. In FIG. 7, the GUID is a 16-byte (128-bit) number, but other data lengths may be employed for the unique identifier 710 in other implementations.

The version number 712 may further qualify or identify the information associated with the corresponding remote control device in the listing 612. Depending on the embodiment, the version number 712 may refer to the remote control device itself, the data provided in the file indicated by the URL 704, both, or to some other aspect of the associated remote control device.

After the communication device 302 receives the listing 612, the communication device 302 transmits a selection 614 of one of the remote control devices noted in the listing 612 to the network server 304. In one example, the communication device 302 selects the remote control device based on the highest match count 706 value of the listed remote control devices. In the specific example of FIG. 7, the first remote control device (the "DISH Remote") would be selected. In another example, a listing of the various remote control devices 302, possibly along with their match counts 706, graphical representations, and other information, may be presented to the user via the user interface 504 of the communication device 302, thus allowing the user to make the selection 614. In this latter scenario, the user may select a remote control device not exhibiting the highest match count 706.

In one embodiment, the selection 314 may be the URL 704 from the listing 612. For example, presuming the DISH Remote was selected, the communication device 302 may transmit to the network server 304 the URL 704 noted for that remote control device in the listing 612. Other methods of indicating the selection 614, such as passing the GUID 710 or the name 708 of the requested remote control device, may be employed in other implementations.

In response to receiving the selection 614, the network server 304 returns the file or information containing a description 616 for the selected remote control device to the communication device 302. As shown in FIG. 4, the description 616 is represented by or contained in the information 408 for the selected remote control device. The description 616 may include a number of data items useful in employing the selected remote control device to control the set-top box 306. For example, the description 616 may include any of the device type, brand, and model of an electronic device most closely associated with the selected remote control device. The communication device 302 may compare such information with the indication 610 of the set-top box 306 to verify that the selected remote control device is compatible with the set-top box 306.

Further, a graphical representation of the remote control device, such as a "skin" with identifiable "buttons", "keys", and the like located thereon, may be provided for display to the user over the user interface 504 of the communication device 302. Such a representation would allow the user to control the set-top box 306 by interacting with the graphical representation of the remote, such as by clicking various "buttons" shown on the remote using a mouse or other user input device. To support this use model, the description 616 may include a map which identifies and locates each button, names or identifications of the buttons presentable to the user as help information, keyboard short cuts for accessing the button, and command code information associated with each of the buttons. Other information included in the description 616 but not described above may be possible in other implementations.

In one instance, the description 616 may be formatted as one or more text files, such as an Extensible Markup Language (XML) file. However, any other format capable of relaying the description 616 to the communication device 302 may be utilized.

In another implementation, the communication device 302 may download the remote control device descriptions 616 for all of the remote control devices provided in the listing 612 upon receiving the listing 612. In one example, the communication device 302 may issue one or more requests to the network server 304 for the descriptions 616 of all of the remotes in the listing 612, to which the server 304 may respond by transmitting the requested descriptions. In another scenario, the server 304 may transfer the descriptions 616 with the listing 612 without an explicit request from the communication device 602. As a result, a selection for a particular remote control device that is made by either the user or the control circuitry 506 of the communication device 302 may not be transmitted to the network server 304, as the communication device 302 has already acquired all possible remote control device descriptions 616 that are applicable to the set-top box 306. A potential benefit of this implementation is that the communication device 302 may provide the graphical representation of each of the remote control devices shown in the listing 612 to the user, thus allowing the user to make a more informed choice regarding the selection of the remote control device.

Figure 8:
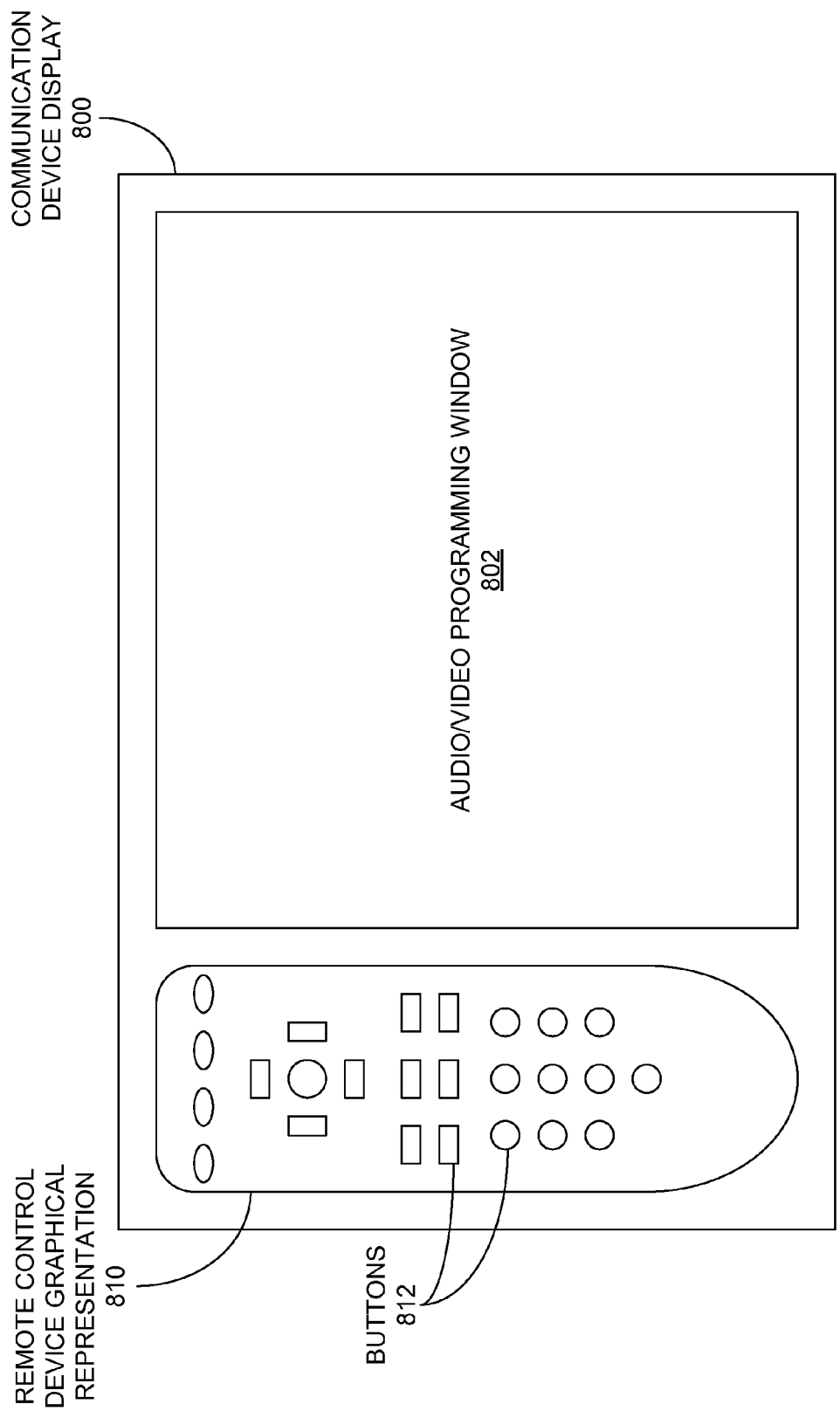
FIG. 8 is a graphical depiction of a display of the communication device of the communication system of FIG. 3 according to an embodiment of the invention.

FIG. 8 provides a sample view of a visual display 800 of the communication device 302 presenting a graphical representation 810 of a remote control device, such as the selected remote control device "DISH Remote" discussed above, based on the description 616 received from the network server 304. Also provided is an audio/video programming window 802 presenting audio/video programming delivered from the set-top box 306 by way of the place-shifting device 305 over the communication network 308 to the communication device 302. To control the content being displayed in the audio/video programming window 802, the user "presses" one or more of the buttons 812 of the graphical representation 810 of the selected remote control device as if the user were using the actual remote control device. In turn, the control circuitry 506 of the communication device 506 receives the user actions via the user interface 504 and transforms the actions into commands 618 for the set-top box 306 using the description 616 of the selected remote control. The commands 618 are then transmitted over the communication network 308 to the place-shifting device 305, which transforms the commands 608 into the infrared remote control signals 311 transmitted to the set-top box 306. Thus, by employing the selected remote control device, the user is able to control the set-top box 306 over the communication network 308 to receive the desired programming over that same network 308, and thus view the programming via the programming window 802.

While the embodiments discussed above involve a single communication device 302 providing remote control commands over the communication network 308 to a single set-top box 306, other implementations may involve multiple communication devices 302, each of which transmits information to, and receives information from, the network server 304 to access a particular electronic device, such as the set-top box 306. Further, a single communication device 302, by way of a place-shifting device 305, may issue commands to more than one set-top box 306 or other audio/video component. In that case, the communication device 302 may provide an indication 610 of each component which the device 302 will control. Thereafter, the communication device 302 will receive and employ a description 616 of the remote control device associated with each component to control each of these components concurrently.

At least some embodiments as described herein provide a system and method by which a communication device receives information relating to a remote control device from a separate communication node. The communication device then uses that information to emulate the remote control device to control an electronic device over a communication network. In some cases, the communication device may select the remote control device to be used from several possible remote control devices compatible with the device to be controlled. As a result, information concerning all possible remote control devices that may be used in such an environment may be stored in a centralized server or node, as opposed to each separate communication device, thus significantly reducing the amount of storage in each communication device that is consumed by remote control device descriptions While several embodiments of the invention have been discussed herein, other implementations encompassed by the scope of the invention are possible. For example, while some embodiments disclosed herein have been described within the context of a satellite television receiver or set-top box to be controlled remotely, other electronic devices that may be controlled by remote control devices, including, but not limited to, cable and terrestrial television receivers, audio receivers, gaming consoles, DVRs, and CD and DVD players, may benefit from application of the concepts explicated above. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method of providing a description of a first remote control device to a communication device configured to interact with an electronic device over a communication network as a remote control device, the method comprising:

transferring an indication of the electronic device from the communication device over the communication network to a communication node;

receiving information identifying each of a plurality of remote control devices at the communication device from the communication node over the communication network in response to transferring the indication, wherein the plurality of remote control devices comprises the first remote control device, wherein the information for each of the plurality of remote control devices comprises a score for each of the plurality of remote control devices, and wherein the score indicates how closely the associated remote control device is matched with the electronic device;

selecting the first remote control device from the plurality of remote control devices based on the scores;

transferring the selection of the first remote control device from the communication device over the communication interface to the communication node;

receiving the description of the first remote control device from the communication node over the communication network at the communication device, wherein the first remote control device is associated with the electronic device and wherein the communication device receives the description of the first remote control device in response to the selection; and transferring a command over the communication network to the electronic device, wherein the command is generated using the description of the first remote control device.

2. The method of claim 1, wherein transferring the command to the electronic device comprises:

transferring the command to the electronic device over the communication network to a place-shifting device coupled with the electronic device; and forwarding the command from the place-shifting device to the electronic device.

3. The method of claim 1, wherein:

the indication of the electronic device comprises at least one of a type of the electronic device, a brand of the electronic device, a model of the electronic device, and a device infrared code of the electronic device.

4. The method of claim 1, further comprising:
receiving information identifying each of a plurality of remote control devices at the communication device from the communication node over the communication network in response to transferring the indication, wherein the plurality of remote control devices comprises the first remote control device;
presenting a listing of the plurality of the remote control devices to a user of the communication device;
receiving a selection of the first remote control device from the user in response to the listing; and
transferring the selection of the first remote control device from the communication device over the communication interface to the communication node;
wherein the communication device receives the description of the first remote control device in response to the selection.

5. The method of claim 1, further comprising:
receiving information identifying each of a plurality of remote control devices at the communication device from the communication node over the communication network in response to transferring the indication, wherein the plurality of remote control devices comprises the first remote control device;
downloading a description for each of the plurality of remote control devices to the communication device from the communication node over the communication network;
presenting a listing of the plurality of remote control devices to a user of the communication device; and
receiving a selection of the first remote control device from the user in response to the listing.

6. The method of claim 1, further comprising:
receiving information identifying each of a plurality of remote control devices at the communication device from the communication node over the communication network in response to transferring the indication, wherein the plurality of remote control devices comprises the first remote control device, wherein the information for each of the plurality of remote control devices comprises a score for each of the plurality of remote control devices, and wherein the score indicates how closely the associated remote control device is matched with the electronic device;
receiving a description for each of the plurality of remote control devices at the electronic device from the communication node over the communication network; and
selecting the first remote control device from the plurality of remote control devices based on the scores.

7. The method of claim 6, wherein:
the information for at least one of the plurality of the remote control devices comprises at least one of a globally unique identifier for the at least one of the plurality of remote control devices, a name for the at least one of the plurality of remote control devices, and a version number for the at least one of the plurality of remote control devices.

8. The method of claim 6, wherein:
the information for each of the plurality of the remote control devices comprises an address for a file associated with the associated remote control device; and
the file comprises the description of the associated remote control device.

9. The method of claim 8, wherein:
the communication network comprises an Internet Protocol network;
the information comprises an extensible markup language file; and
the address for the file comprises a uniform resource locator.

10. The method of claim 8, wherein:
the file comprises an extensible markup language file.

11. The method of claim 1, wherein:
the description for the first remote control device comprises graphical information representing the first remote control device;
the method further comprises presenting a graphical representation of the first remote control device for display to a user of the communication device, and receiving the command to be transferred over the communication network to the electronic device from the user by way of the user interacting with the graphical information representing the first remote control device.

12. The method of claim 1, wherein:
the command comprises a command code; and
the command code is included in the description of the first remote control device.

13. A communication node, comprising:
a communication interface configured to receive an indication of an electronic device from a communication network;
data storage configured to store a description of each of a plurality of remote control devices, wherein the plurality of remote control devices comprises a first remote control device associated with the electronic device, and wherein the description enables the communication device to transmit commands associated with the remote control device over the communication interface to the electronic device; and
control circuitry configured to:
receive the indication of the electronic device via the communication interface from the communication device over the communication network;
in response to receiving the indication, providing information identifying each of the plurality of remote control devices to the communications device, wherein the information for each of the plurality of remote control devices comprises a score for each of the plurality of remote control devices, and wherein the score indicates how closely the associated remote control device is matched with the electronic device;
receiving a selection of the first remote control device from the communications device; and
transmit the description of the first remote control device associated with the electronic device via the communication interface over the communication network to the communication device.

14. The communication node of claim 13, wherein:
the indication of the electronic device comprises at least one of a type of the electronic device, a brand of the electronic device, a model of the electronic device, and a device infrared code of the electronic device.

15. The communication node of claim 13, wherein:
the data storage is configured to store a description for each of a plurality of remote control devices, wherein the plurality of remote control devices comprises the first remote control device; and
the control circuitry is configured to:
in response to the indication, transmit via the communication interface over the communication network to the communication device information identifying each of a subset of the plurality of remote control devices, wherein the subset of the plurality of remote control devices are associated with the electronic device; and in response to the information, receive from the communication device over the communication network via the communication interface a selection of the first remote control device from the plurality of remote control devices;

wherein the description of the first remote control device is transferred to the communication device in response to the selection.

16. The communication node of claim 13, wherein the control circuitry is configured to:

generate the scores for each of the subset of the plurality of remote control devices.

* * * * *